United States Patent
Wild et al.

(10) Patent No.: US 9,587,145 B2
(45) Date of Patent: Mar. 7, 2017

(54) HIGH TACK PRESSURE-SENSITIVE ADHESIVE

(71) Applicant: Iconex LLC, Duluth, GA (US)

(72) Inventors: Martha Patricia Wild, Duluth, GA (US); James Kirby Price, Morristown, TN (US); Shannon Dwayne McGhinnis, Morristown, TN (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 14/305,665

(22) Filed: Jun. 16, 2014

(65) Prior Publication Data

US 2015/0361305 A1    Dec. 17, 2015

(51) Int. Cl.
  *C09J 7/02*     (2006.01)
  *G09F 3/02*     (2006.01)
  *G09F 3/10*     (2006.01)

(52) U.S. Cl.
  CPC .............. *C09J 7/0207* (2013.01); *G09F 3/02* (2013.01); *C09J 2201/28* (2013.01); *C09J 2203/334* (2013.01); *G09F 3/10* (2013.01); *G09F 2003/0201* (2013.01); *G09F 2003/023* (2013.01); *Y10T 428/24802* (2015.01); *Y10T 428/2839* (2015.01)

(58) Field of Classification Search
  None
  See application file for complete search history.

(56) References Cited

U.S. PATENT DOCUMENTS

| | | | | |
|---|---|---|---|---|
| 6,302,994 | B1* | 10/2001 | Kamiya et al. | 156/320 |
| 7,329,449 | B2* | 2/2008 | Wiklof et al. | 428/42.1 |
| 2010/0300613 | A1* | 12/2010 | Stogbauer et al. | 156/256 |
| 2011/0205326 | A1* | 8/2011 | Roth et al. | 347/171 |
| 2013/0143010 | A1* | 6/2013 | Buchner et al. | 428/200 |

* cited by examiner

*Primary Examiner* — Laura Powers
(74) *Attorney, Agent, or Firm* — Schwegman Lundberg & Woessner, P.A.

(57) ABSTRACT

A high-tack pressure sensitive adhesive is provided. A high-tack adhesive is mixed with a low-tack adhesive to form an adhesive mixture. The adhesive mixture applied to a portion of a substrate as a high-tack pressure sensitive adhesive patch. In an embodiment, the adhesive mixture includes a thickening agent.

7 Claims, 10 Drawing Sheets

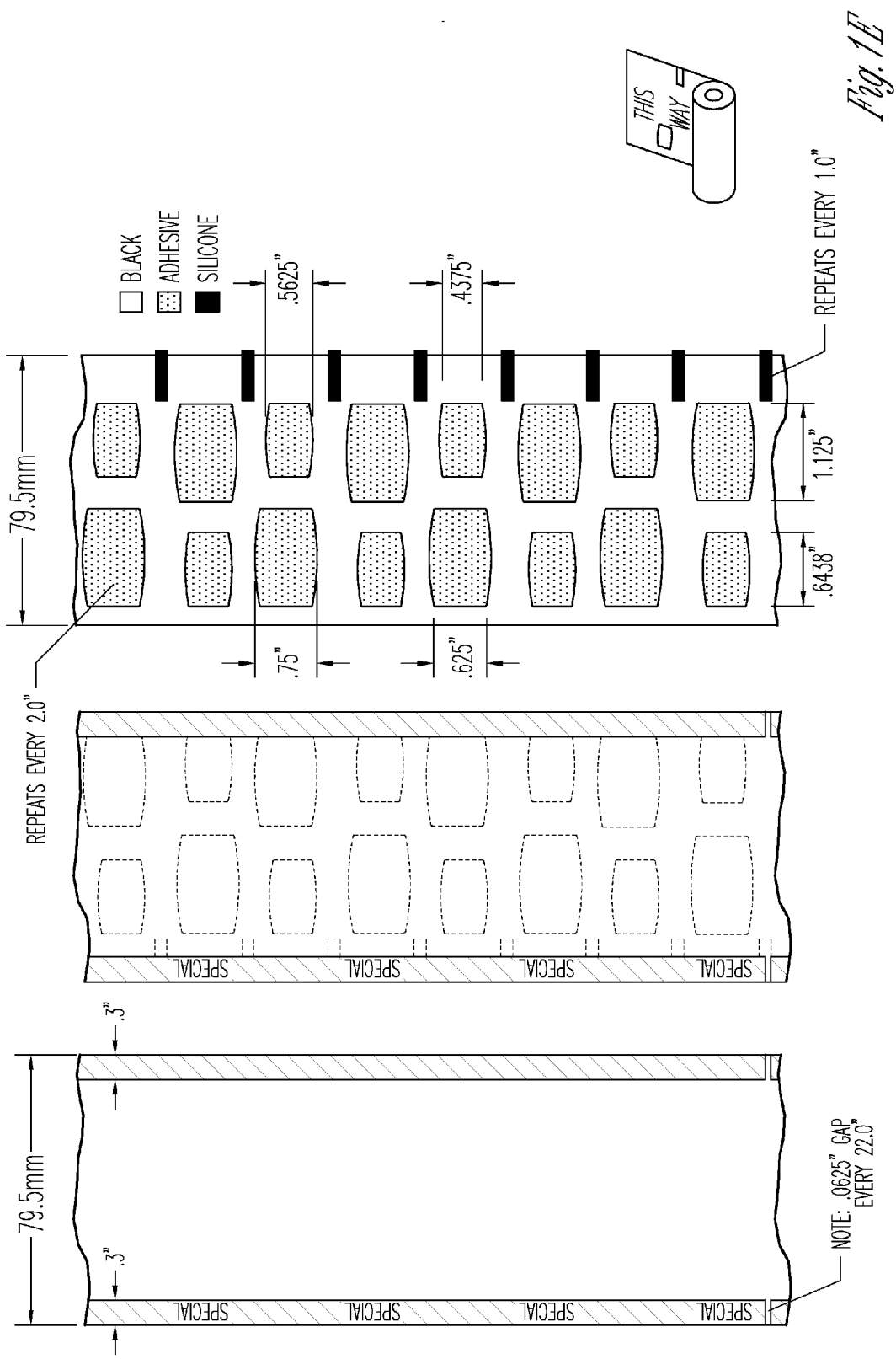

HIGH TACK PRESSURE-SENSITIVE ADHESIVE

BACKGROUND

The ubiquitous adhesive label is available in a myriad of configurations for use in various applications, including specialty applications. The typical an adhesive label includes pressure-sensitive adhesive on its back side and initially laminated to an underlying release liner.

Adhesive labels may be found in individual sheets, or joined together in a fan-fold stack, or in a continuous roll. Label rolls are typically used in commercial applications requiring high volume use of labels.

The challenge with adhesive-based printing applications is that the adhesive can collect on mechanical components of the printer during printer operation. So, any label having an adhesive coating that is fed through a printer can interfere with print quality and cause printer jams.

An adhesive application to a label having too much or too little tack (bonding force to a surface) can exacerbate: printer paper jams, printer component failure, and poor print quality, and can create a variety of issues when the label is coated with the adhesive and/or when the label with the adhesive is printed, such as: gelling, non uniform coating of the adhesive, splattering, low peel force, printer feed jamming, and the like.

Therefore, it would be desirable to provide a high tack pressure-sensitive adhesive that does not interfere with the printing of media having that high tack pressure-sensitive adhesive.

SUMMARY

In various embodiments, a high tack pressure-sensitive adhesive and methods of applying to and printing on media having that adhesive are provided.

An example adhesive includes a mixture of a low-tack adhesive, a high tack adhesive, and, optionally, a thickening agent.

In an embodiment, the adhesive mixture is applied to a label having a first surface of a substrate coated with the mixture and a second surface of the substrate coated with a release coating.

The substrate can be paper, such as a base paper, a single layer coated paper, a several layer coated paper, a thermal coated paper, a top coated paper (over the thermal coating), film, or any other substrate that can receive coated layers.

The adhesive mixture can be selectively applied to the substrate in predefined and/or alternating patch designs.

BRIEF DESCRIPTION OF THE DRAWINGS

FIG. 1E is a diagram depicting an example generic brand name and/or logo design for adhesive patches applied to labels, according to an example embodiment.

DETAILED DESCRIPTION

Figure 1A:
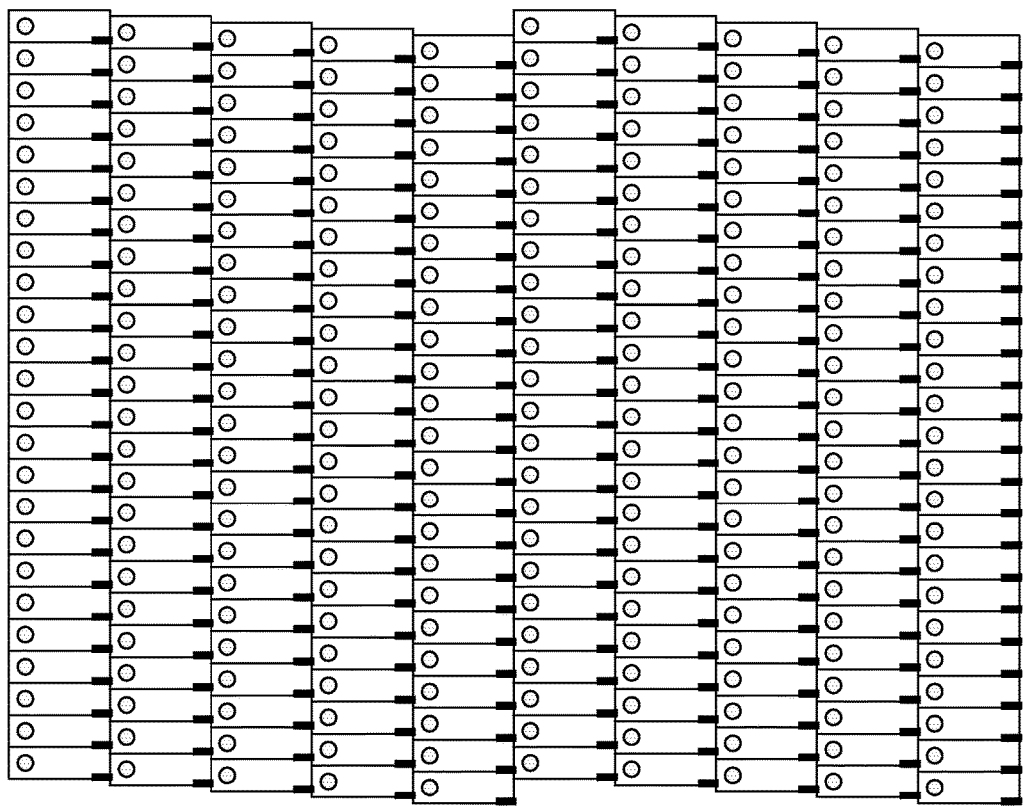
FIG. 1A is a diagram depicting an example dot design for adhesive patches on a surface of a substrate, according to an example embodiment.

As will be described more completely herein and below, the high-tack pressure sensitive adhesive improves paper feed for printers and other performance and processing properties for thermal-printed, labels, linerless labels, and related products.

The term "Sticky Media" refers to a paper product (such as a label or linerless label) featuring a thermal top coating (i.e. a coating that darkens when exposed to heat, known as a "thermal coating") and a pressure sensitive adhesive (PSA) coated on the reverse side of a substrate. The thermal-coated top surface is over coated with low surface energy silicone to allow the paper to release from itself when wound into a roll, without picking or causing other product defects in the media.

The high-tack adhesive gives a high peel force to failure, dries quickly enough to reduce the tendency of the underlying paper (media) to wrinkle, works with lower caliper (thinner) papers, does not pre-activate any thermally active coating of the paper (or other substrate for other media), and inhibits printer-feed problems. Further, adhesively-coated media can be wound into roll form without the adhesive penetrating the smooth coating of the opposing surface and causing surface damage (i.e. picking) when the roll is unwound. It is to be noted that this is a difficult set of performance criteria to meet and prior efforts in the industry to use an adhesive with microspheres resulted in non-uniform coat weights, splattering of the adhesive, low peel forces, and failure of the paper feed apparatus (jamming) when the initial adhesion strength (tack) was increased (elevated viscosity improves tack). Further, the prior-attempted adhesive contained microspheres that tend to gel rapidly when the adhesive exceeds some upper viscosity level, which rendered the adhesive impractical from a production standpoint. Conversely, excessively low adhesive viscosity will prevent successful printing using a flexographic technique.

As will be demonstrated, these prior unsuccessfully attempted adhesives used in printing applications are resolved with the adhesive and methods presented herein.

Low and high-tack adhesives are combined with an additive to increase the viscosity of the resulting adhesive. Moreover, the combination of low and high-tack adhesives with the additive can be used when either one of the mixed adhesives or both of the mixed adhesives are too low in viscosity for flexographic printing (flexo). The resulting adhesive gains viscosity (from that which the individual adhesives had prior to combination with one another) without forming a gel, even when microspheres are present in the low-tack adhesive.

The additive is a thickening additive, which enables the combined adhesive to work for flexo. For example, in one instance a thickener was added at a rate of 0.3% by mass, which was enough to increase the viscosity to allow the press to operate, and gave good adhesion for the finished product (high peel force) while at the same time not causing gelling even when the lower tack adhesive contained microspheres.

In thermal printing products, the reverse side of the sheet (media roll) is often printed with marks ("sense marks") that are read by a printer to instruct the printer as to where to cut the media. For Sticky Media it is important that the applied adhesive not coincide with the cutting region of the printer. Even with proper placement of a properly formulated adhesive, adhesive build-up can occur within printers and cause jamming. If the viscosity of a low-tack adhesive is increased through the addition of thickener, this will tend to jam the printer. High-tack adhesives will also tend to jam a printer.

However, as is presented herein, a mixture of low and high tack adhesives with the addition of a thickener actually inhibits printer jamming.

The adhesive is applied to a surface of print media in patches. In an embodiment, these patches may be of any geometric shape, of varying size, and applied in various patterns.

It is to be noted that there is a trade-off between area of coverage on a substrate and the amount of adhesion generated. So, for many applications, when using smaller patches it is necessary to increase the tack of the adhesive. Thus, by use of a high-tack adhesive in conjunction with a smaller patch size has the added benefit of reducing the amount of printer cleaning required as well as preventing jamming.

The adhesive (presented herein) enables the production of a superior high-tack adhesive, thereby enabling successful use of smaller patches or patterns that use lower patch frequency. This results in lower amounts of adhesive being required and reduces the cost of manufacture. Examples of smaller adhesive patches are presented in the FIGS. 1A-1C below.

Moreover, to further improve the printer operation, the silicone release coating (applied to an opposite side of the substrate from the adhesive patch) may be reduced to a partial covering of the substrate. This partial coverage may be applied in lanes, which have been precisely placed (aligned) to coincide with the application of the adhesive pattern present on the reverse side of the substrate. This reduced level of silicone coating (as shown in the FIG. 1B), combined with smaller patches of adhesive (FIG. 1A) greatly improves printer performance with respect to build-up of fouling material from Sticky Media.

It is to be noted that other applications of the adhesives herein may also be used, such as an application done in combination with a silicone free release overcoat of the substrate.

The adhesive includes a mixture of a low-tack adhesive and a high-tack adhesive.

In an embodiment, the mixture also includes a thickening agent (thickener).

In an embodiment, the low tack-adhesive is a microsphere, such as but not limited to GelTac 7349 or GelTac 7356 (manufactured by Advanced Polymer International).

In an embodiment, the high-tack adhesive is, by way of example only, E5521 manufactured by Avery Corporation.

In an embodiment, the thickener is Tafigel PUR 40 supplied by Munzig.

In an embodiment, the mixture includes approximately 25% of the high-tack adhesive and 75% of the low tack adhesive.

In an embodiment, the mixture includes approximately 25% of the high-tack adhesive, approximately 74.7% of the low-tack adhesive, and approximately 0.3% of the thickener.

In an embodiment, the coat weight for the mixture with the thickener when applied in patches to the substrate is about 12.8 gsm.

In an embodiment, the coat weight for the mixture without a thickener is 14.6 gsm.

In an embodiment, the peel force of the mixture with the thickener is about 2.7 lbf.

In an embodiment, the peel force the mixture without the thickener is about 3.7 lbf.

In an embodiment, the peel force of the mixture is about half the peel force of the high-tack adhesive.

In an embodiment, the peel force of the mixture is greater than the peel force of the low-tack adhesive.

In an embodiment, the viscosity of the mixture is approximately 5500 cps.

In an embodiment, the viscosity of the mixture with the thickener is greater than the low-tack adhesive and the high-tack adhesive.

In an embodiment, the viscosity of the mixture without the thickener is greater than the viscosity of the high-tack adhesive and also greater than the viscosity of the low-tack adhesive.

In an embodiment, the viscosity of the mixture with the thickener is approximately double the viscosity of the high-tack adhesive.

In a trial using a microsphere low-tack adhesive as GelTac 7349 (viscosity 3000 cps and peel force 1.6 lbf), a high-tack adhesive as Avery E5521 (viscosity 2750 cps and peel force 7.1 lbf), and a thickener as PUR 40, an adhesive mixture was formulated using: 74.7% of GelTac 7349, 0.3% PUR 40, and 25% E5521. The resulting adhesive mixture had a viscosity of 5500 cps and peel force of 2.7 lbf. The adhesive mixture was applied to thermally coated paper as adhesive patches having a coat weight of 12.8 gsm and applied as 4 patches every 2 inches to the paper. The thermally coated paper (having a release coating) with the adhesive patches was then processed through multiple thermal printers and exhibited no jamming of the printers. Further, when sense marks were present and used on the thermal paper by the thermal printer for cutting the paper no jamming of the printers was detected. Moreover, the adhesive patches had good peel force at 2.7 lbf.

Furthermore, when low tack and high tack adhesives were mixed together without the thickener no jamming occurred with or without usage of sense marks present on the thermally coated paper. Here, the mixture without the thickener includes 75% of the low-tack adhesive and 25% of the high-tack adhesive. The microsphere low-tack adhesive was GelTac 7356 HV manufactured by Advanced Polymer International, the high-tack adhesive remained E5521 from Avery Corporation. Both the high and low-tack adhesives had an original viscosity of 2750 cps and the resulting mixture (without the thickener) had a viscosity of 3500 cps. The original peel force for the microsphere low-tack adhesive was 3.9 lbf and for the high-tack adhesive 7.1 lbf. The mixture without the thickener had a peel force of 3.7 lbf. The mixture without the thickener was applied to the thermally coated paper with the sense marks using a coat weight of 14.6 gsm and applied as 4 adhesive patches every 2 inches to the paper. No jamming of the printer occurred and good peel forces were exhibited without usage of the sense marks. It is noted, that the low-tack adhesive when tested alone jammed the printers when the printers attempted to cut the paper off the sense marks, as did the high-tack adhesive; but the combination of the high-tack and low-tack adhesive did not jam any of the printers when cutting the paper off the sense marks.

Four different thermal printers were used during trials. The high-tack and low-tack adhesives were tested individually (without combination of the other adhesive or thickener), tested in a mixture without the thickener, and tested in a mixture with the thickener. Moreover, each test included use of sense marks on the paper and without sense marks. The high-tack adhesive patches jammed the printer when used alone on all the printers and with or without usage of the sense marks by the printers. The low-tack adhesive patches jammed the printer when using sense cutting marks in the printer. However, the mixture (with or without the thickener) did not jam the printer with or without usage of the sense marks by the printers.

The adhesive mixture (with or without the thickener) increases the peel force significantly without damaging a lower surface abrasion coating. To date, commercial linerless or traditional labels have very low tack adhesives when used in combination with silicone free release material. However, this adhesive technology imparts high peel force strength without removing the silicone free release overcoat layer.

According to various other embodiments, the adhesive mixture (with or without the thicker) can be selectively applied in a variety of designs and shapes and locations on substrates and labels as presented in the FIGS. 1A-1F.

FIG. 1A is a diagram depicting an example dot design for adhesive patches on a surface of a substrate, according to an example embodiment. Each rectangle representing a label cut from a web by a printer using sense marks (thick darker and shorter line). The adhesive patches for each label identified by the circles.

Figure 1B:
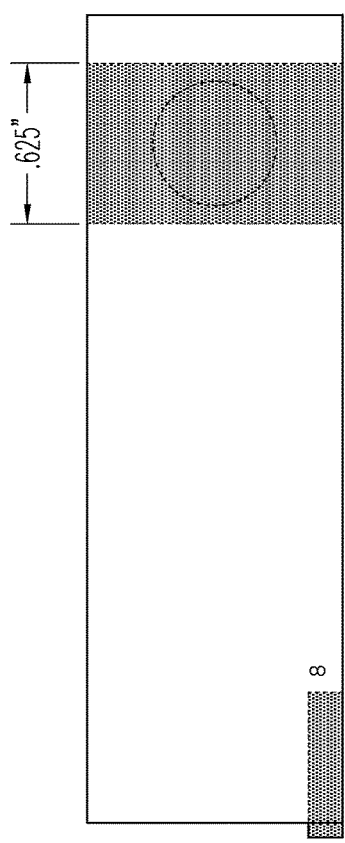
FIGS. 1B and 1C are diagrams depicting example dimensions of an adhesive patch as viewed on a surface of the substrate having an opposing surface of the substrate with a release coating, according to an example embodiment.
Figure 1C:
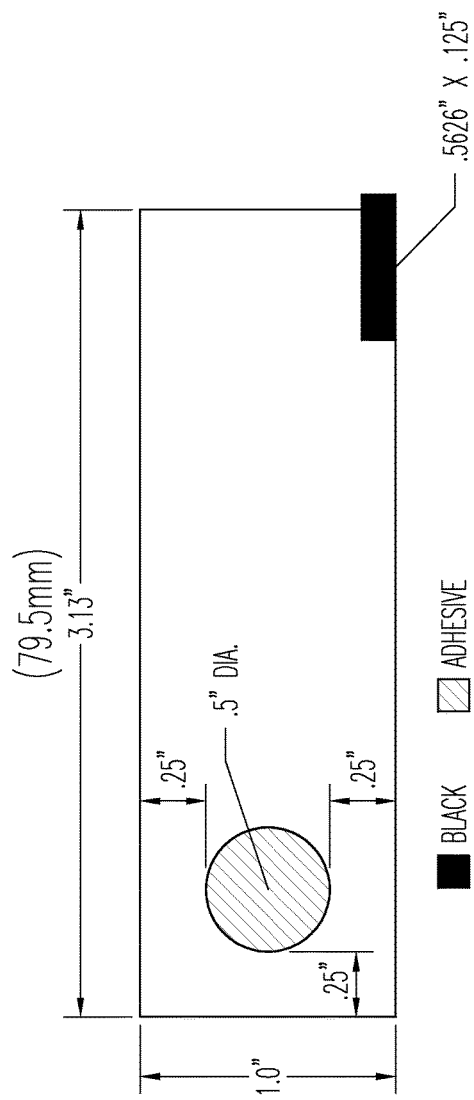

FIGS. 1B and 1C are diagrams depicting example dimensions of an adhesive patch as viewed on a surface of the substrate having an opposing surface of the substrate with a release coating, according to an example embodiment.

The FIG. 1B depicts an adhesive patch as seen through the front of a silicon coated first portion of a substrate. The adhesive patch is on a back portion of the substrate having a width of 0.625 in., the rectangular box labeled 8 representing a sense mark for cutting the substrate as an adhesive label patch.

The FIG. 1C depicts the same adhesive patch showing the location of the circular adhesive patch relative to edges of the label. The label having a height of 1 in. and the sense mark appearing on the same back portion of the label on a far side relative to the adhesive patch. The sense mark also showing some example dimensions for the sense mark.

Figure 1D:
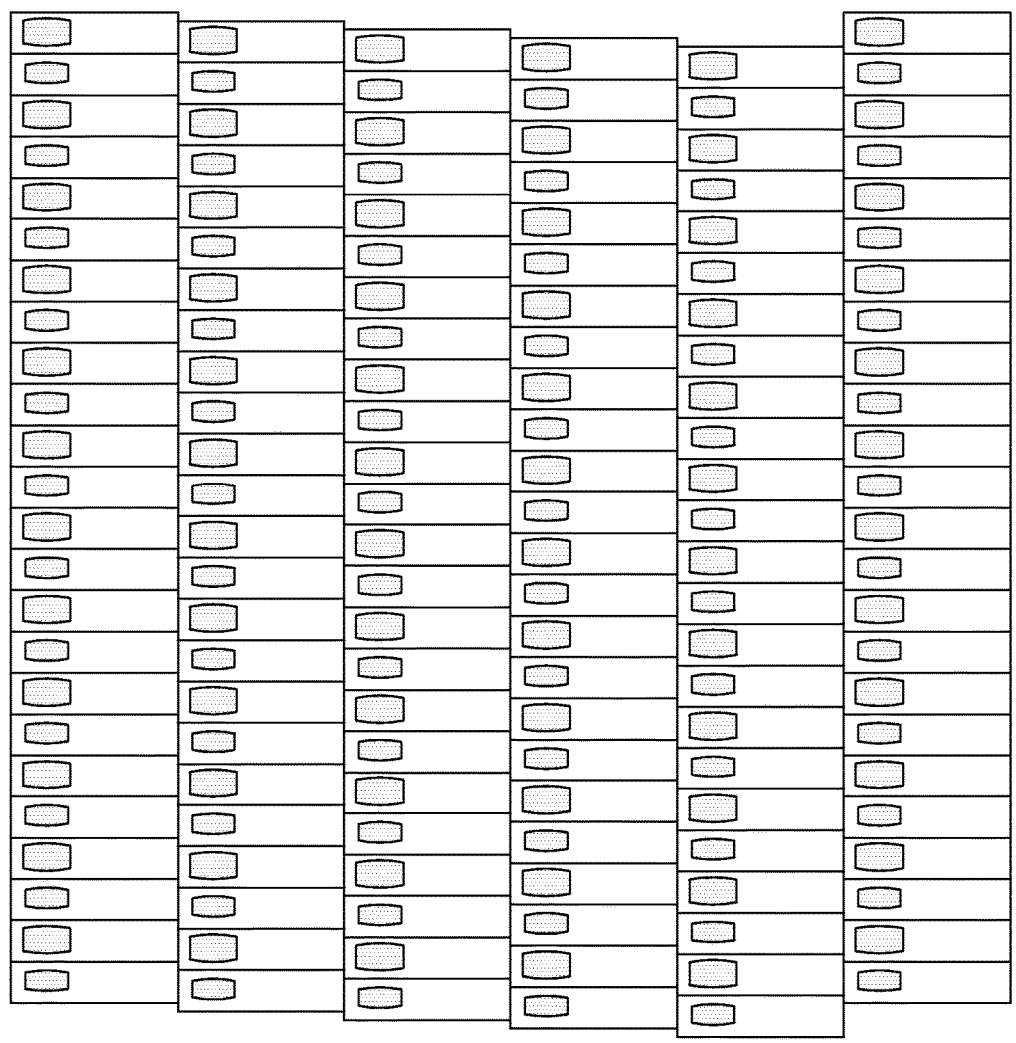
FIG. 1D is a diagram depicting an example multiple pattern design for adhesive patches applied to labels, according to an example embodiment.

FIG. 1D is a diagram depicting an example multiple pattern design for adhesive patches applied to labels, according to an example embodiment.

The FIG. 1D shows alternating adhesive design patterns on a web of labels. Although, FIG. 1D shows two design patterns that alternate every other label, it is noted that other alternating patterns with varying frequency of each pattern can be used as well.

FIG. 1E is a diagram depicting an example generic brand name and/or logo design for adhesive patches applied to labels, according to an example embodiment.

Figure 1F:
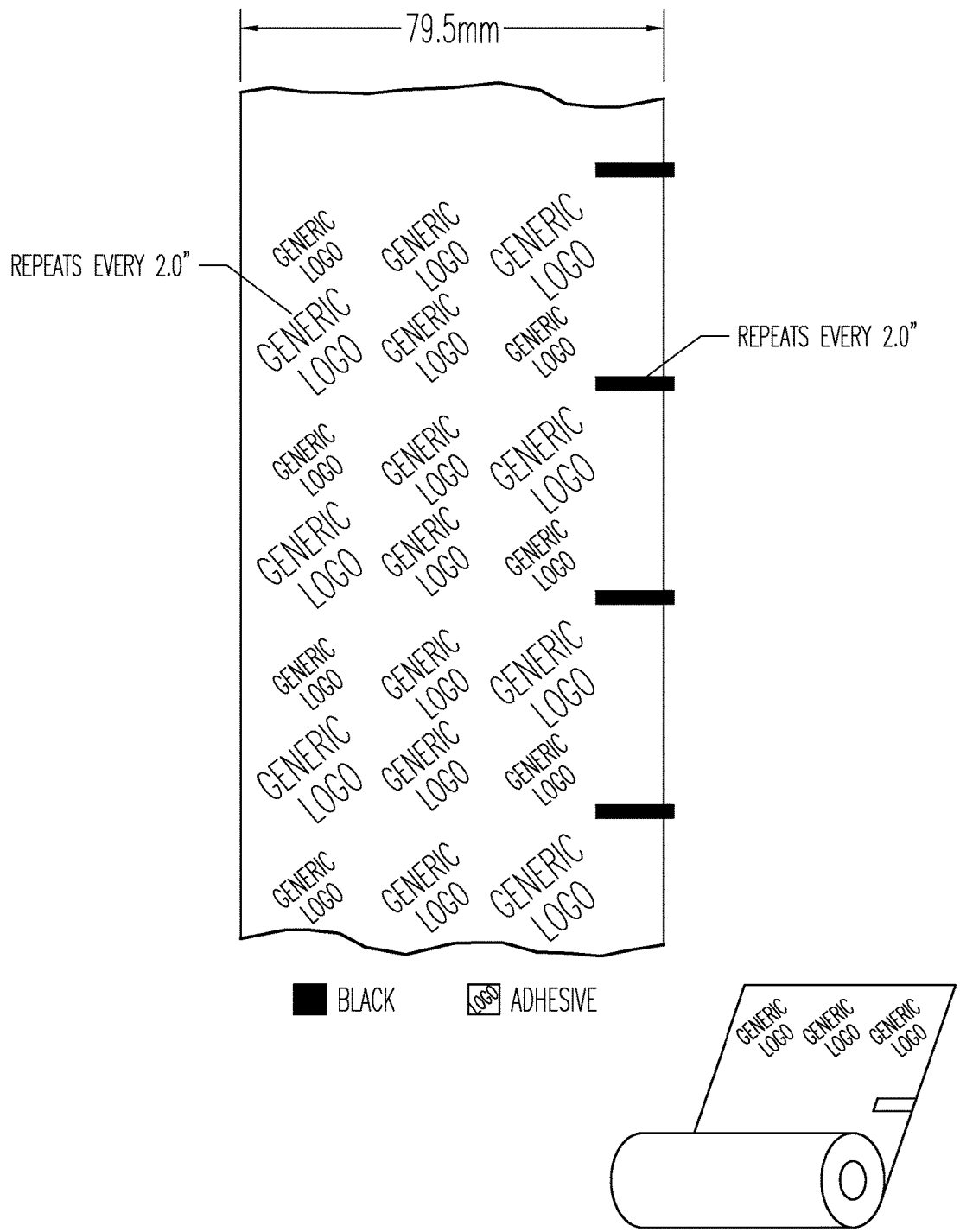
FIG. 1F is a diagram depicting another example generic brand name and/or logo design for adhesive patches applied to labels, according to an example embodiment.

FIG. 1F is a diagram depicting another example generic brand name and/or logo design for adhesive patches applied to labels, according to an example embodiment.

Another example of adhesive design to be used with the adhesive technology in the Sticky Media is a design that spells the customers' brand name or a design that incorporates a logo. Additionally, a design could have both the customers' brand name and their logo (FIGS. 1E-1F). The adhesive is applied on the reverse side of the thermal side of the Sticky Media with a flexo press. The artistic and non-uniform space in between the letters of the customer's brand name forms voids between the adhesive characters providing a surface area equal or larger than the adhesive area. This large and non-uniform and sometimes asymmetric adhesive free area comes into contact with the silicone or silicone free release coating providing random voids that help prevent the mill rolls from telescoping. In addition, by adding a dye to the adhesive and printing a mirror image of the brand name or logo, the adhesive logo/brand name can show through the thermal side appearing like a water mark on the face of the Sticky Media receipt. The chosen dye is water based and images when going through the UV energy. Additionally, the chosen dye can be a fluorescent security dye embedded between the paper and adhesive, which is tamper proof. The dye is visible as a water mark on the paper or as a fluorescent dye under the UV light.

Other embodiments of the invention are now discussed with reference to the FIGS. 2-7.

Figure 2:
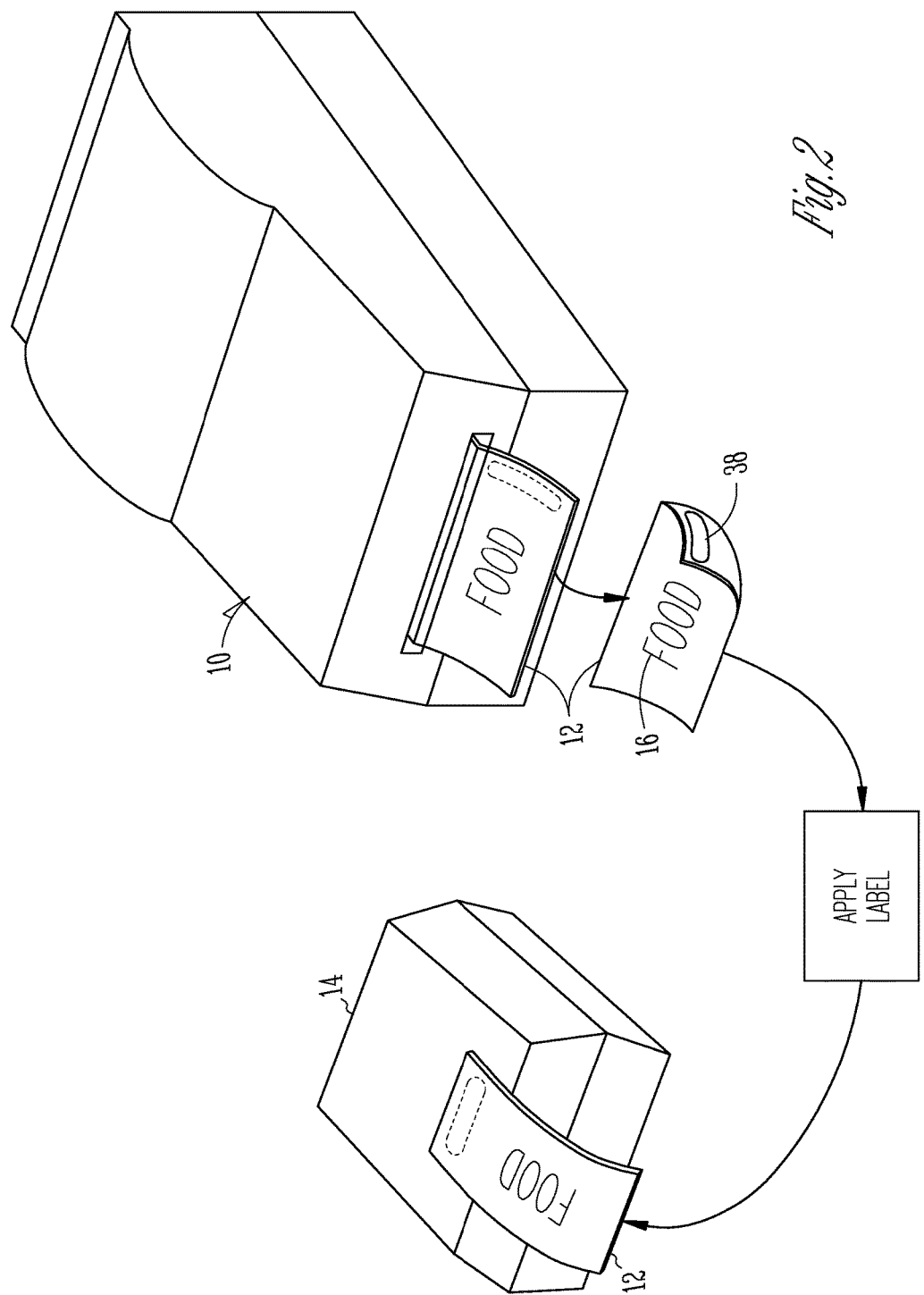
FIG. 2 is a view of a thermal printer dispensing pressure sensitive high tack adhesive labels, according to an embodiment.

FIG. 2 is a view of a thermal printer dispensing pressure sensitive labels having an adhesive patch, according to an embodiment. With reference to FIG. 2, a printer 10 configured for printing in sequence individual labels 12 for use in a typical fast food application. For example, food may be placed in a suitable food package 14 such as the paper box illustrated, or simple wrapping paper. Printer 10 may include a thermal printer, such as a single or double-sided thermal printer (as shown in the FIG. 6).

Print or identifying indicia 16 is printed on a label 12 in printer 10 for identifying the contents of the package, for example. The individual printed label 12 may then be removed from printer 10 and applied using the adhesive mixture 38 to the food package 14 as illustrated in the a method (12 printed from 10 to 16 to APPLY LABEL to 12 applied to 14 using 38 (adhesive patch)), which is shown in FIG. 2.

Figure 3:
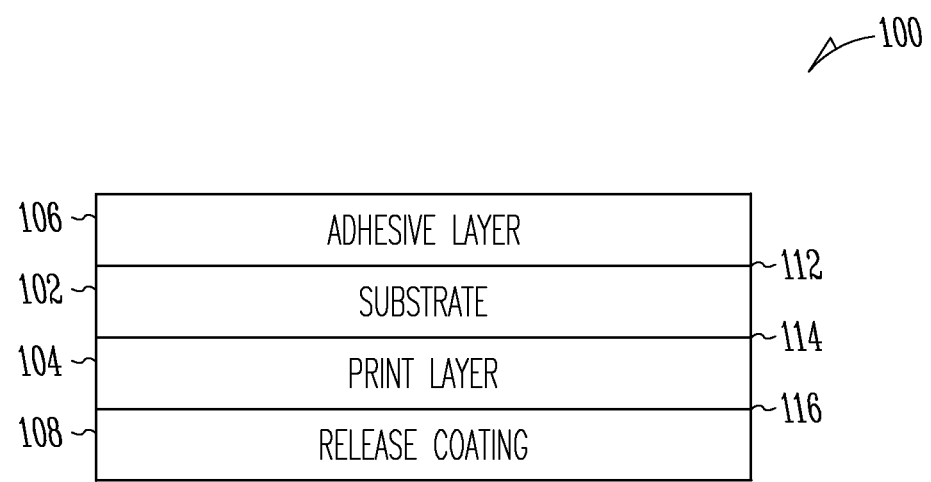
FIG. 3 is a cross-sectional view of a linerless label, according to an embodiment.
Figures 4, 5:
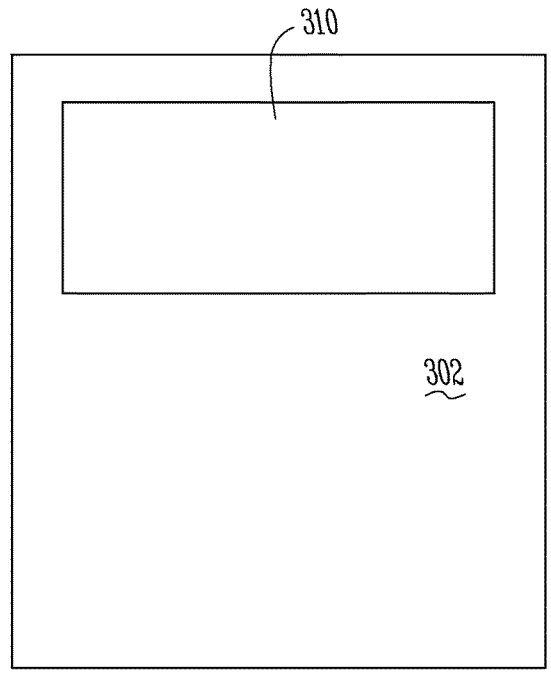
FIG. 4 is a view of a second surface of the linerless label of FIG. 3, including printed text, according to an embodiment.
FIG. 5 is a view of a first surface of the linerless label of FIG. 3, including a strip of activated adhesive, according to an embodiment.

FIGS. 3-5 illustrate an example linerless label 100 that includes a printable surface including imaging material on one side and a heat-activated adhesive surface on the other side having a release coating, according to embodiments of the invention. It is to be noted that other types of labels are also envisioned.

FIG. 3 is a cross-sectional view of a linerless label having an adhesive patch, according to an embodiment.

With reference to FIG. 3, linerless label 100 is formed of layers including a substrate 102, a thermal print layer 104, a heat-activated adhesive layer 106, and a release coating 108. The adhesive layer 106 overlies a first surface 112 of the substrate 102 and the print layer 104 overlies a second surface 114 of the substrate 102 of the print layer 104. The release coating 108 overlies surface 116 of the print layer 104. The adhesive layer 106 having an adhesive patch comprised of the adhesive mixture (with or without a thickener) as discussed in detail above.

In some embodiments, substrates may be thermally resistant in order to prevent heat applied to one side of the substrate from activating materials on the other side of the substrate.

Linerless label 100 may be wound into a roll. The adhesive layer 106 comes into contact with the release coating 108, thereby minimizing adhesion between the adhesive layer 106 and the print layer 104 or underlying substrate 102.

The print layer 104 can include one or more layers of thermal imaging material. For instance, the print layer 104 can include a thermal transfer receptive coating suitable for thermal transfer printing. Alternately or additionally, the print layer 104 may include one or more thermally sensitive coatings which are adapted to change color upon application of heat thereto by which direct thermal printing is provided.

The adhesive layer 106 may include water based adhesives and may be applied in patches (in any of the manners discussed above) using a printing press.

As an alternative to using a separate print layer 104, substrate 102 could comprise thermochromic paper. A thermal print head can print visible patterns on thermochromic paper without requiring an additional print layer to be formed on the substrate.

FIG. 4 is a view of a second surface of the linerless label of the FIG. 3, including an example printed or imaged text, according to an embodiment.

That is, FIG. 4 illustrates an example of a second surface 202 of the linerless label 100 after printing. In this example, the label 100 is a receipt for a fast food meal. As shown in FIG. 3, the second surface 202 of the linerless label 100 has been printed with transaction information by, for example, direct thermal printing of one or more thermally sensitive compounds in the print layer 104.

FIG. 5 is a view of a first surface of the linerless label of FIG. 3, including a strip of activated adhesive (having the adhesive mixture (with or without the thickener)), according to an embodiment.

The first surface 302 includes a wet adhesive portion in the form of a tacky strip 310 of heat-activated adhesive material that has been activated by, for example, a thermal print head. In this example, the tacky strip 310 can be used to attach the receipt to an associated bag of food. Consequently, the bag and the receipt can be handed to a customer simultaneously.

The tacky strip 310 can be formed in one of at least two different methods. In the first method, the entire first surface 112 of the substrate 102 can be overlaid by a heat-activated adhesive that is dry and non-tacky prior to activation. Then, only a selected portion of the heat-activated adhesive, the portion defining the strip 310, is activated by heat applied with a thermal print head. Depending on the embodiment, such activation may occur at or substantially at the same time as, or at some time after the second surface 202 of the receipt has been printed with transaction information. In the second method, a portion of the first surface 302 defining the strip 310 can be overlaid with a heat-activated adhesive that is dry and non-tacky prior to use. The entire heat-activated adhesive can be activated by a thermal print head, which activation may, depending on the embodiment, occur at or substantially at the same time as, or at some time after the second surface 202 of the receipt has been printed with transaction information. Either manner will result in a tacky adhesive strip 310. When a double-sided thermal printer is used, a first thermal print head can print on the second surface 202 of the receipt while a second thermal print head activates the first surface 302 of the receipt.

The substrate can be paper, such as a base paper, a single layer coated paper, a several layer coated paper, a thermal coated paper, a top coated paper (over the thermal coating), film, or any other substrate that can receive coated layers.

Figure 6:
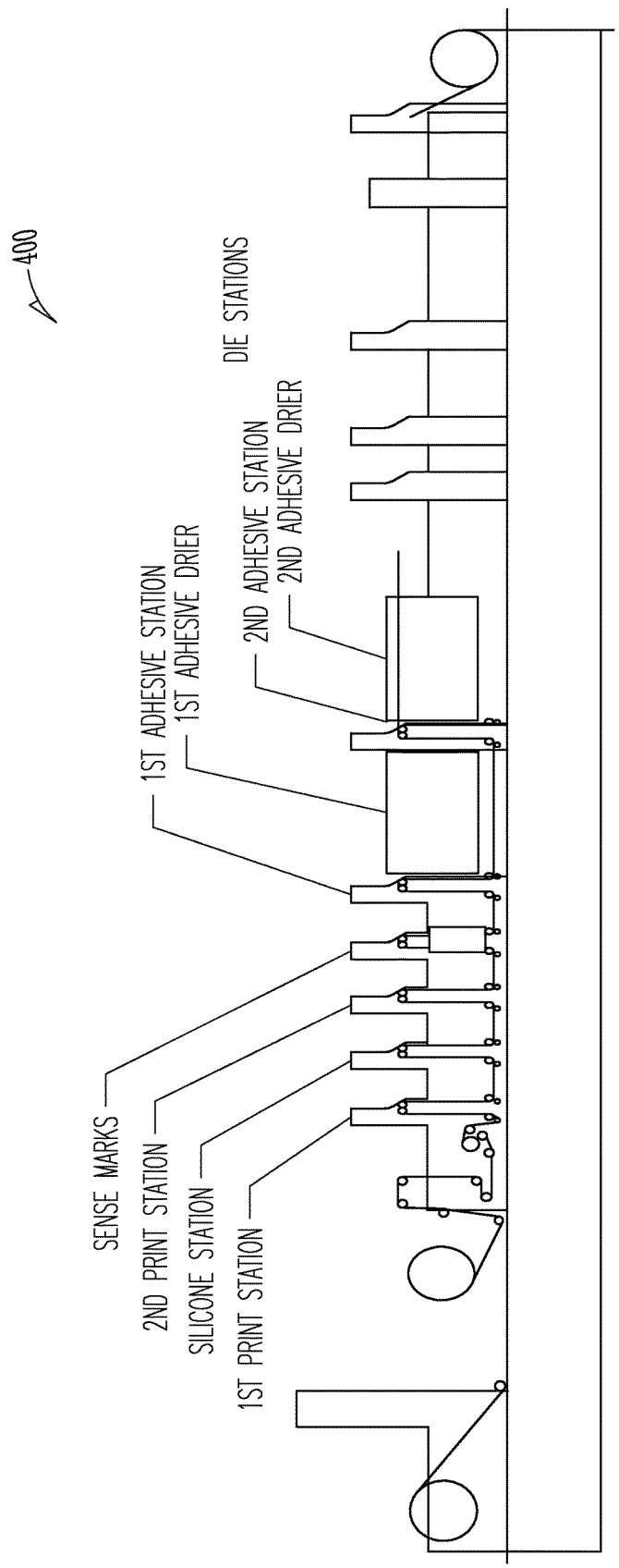
FIG. 6 is an example apparatus for applying adhesive patches, according to an example embodiment.

FIG. 6 is an example apparatus for applying adhesive patches, according to an example embodiment.

An example press 400 is illustrated. The example press is a flexographic or "flexo" printing press.

Figure 7:
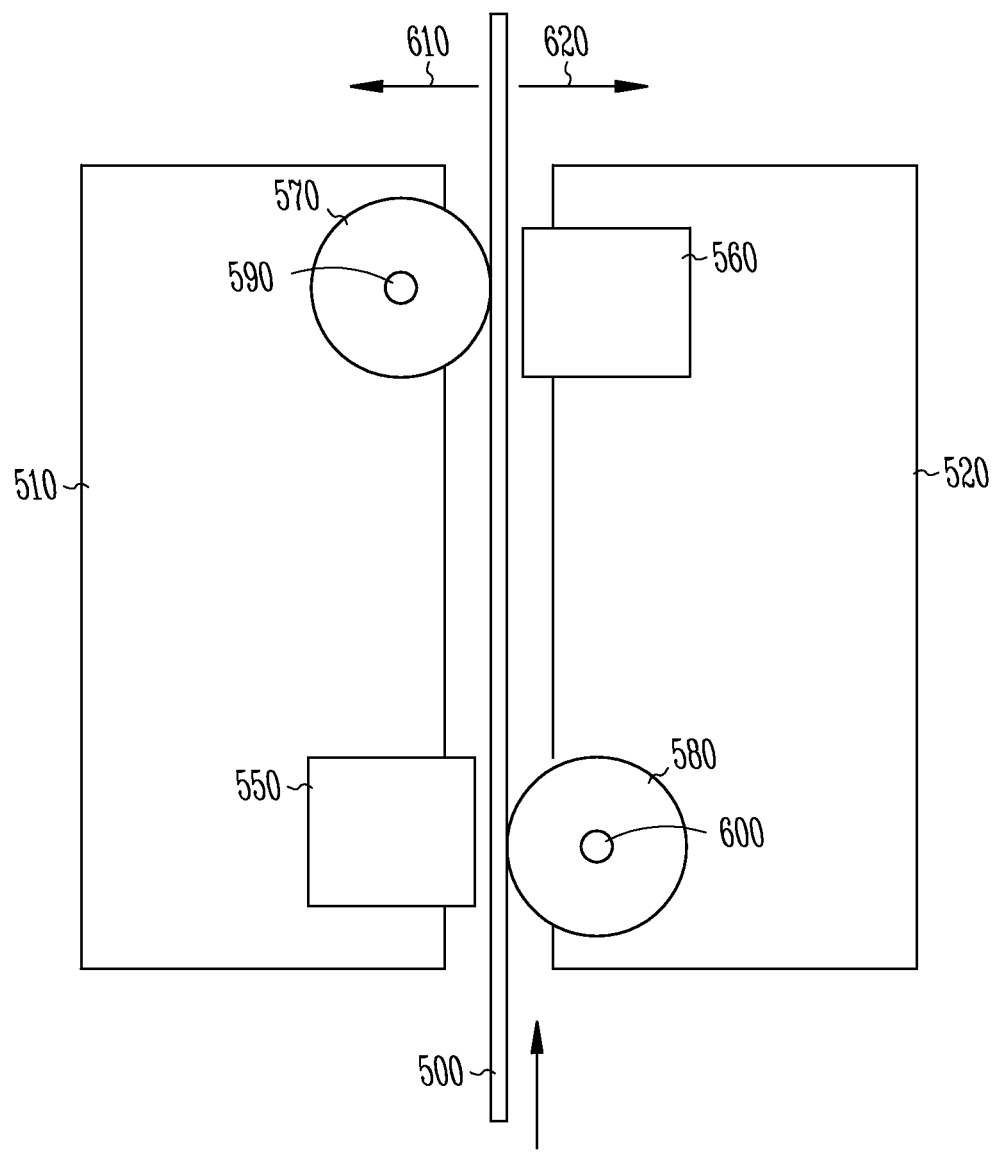
FIG. 7 is an example double-sided thermal printer for printing labels having adhesive patches, according to an embodiment.

FIG. 7 is an example double-sided thermal printer for printing labels having an adhesive patch, according to an embodiment.

An example double-sided thermal printer includes a first print head assembly 510, a second print head assembly 520, and a motor. The first print head assembly 510 includes a first print head 550 and a first platen 570 rotatable about a first shaft 590. Similarly, the second print assembly 520 comprises a second print head 560 and a second platen 580 rotatable about a second shaft 600.

During operation of the double-sided thermal printer, the motor drives the first and second shafts 590 and 600 to turn the first and second platens 570 and 580. Accordingly, when a label 500 is fed into the printer, rotation of the first and second platens 570 and 580 pushes the label 500 in a direction indicated by a vertical arrow. As the label 500 passes through the printer, the first and second print heads 550 and selectively heat the two sides of label 500 to perform printing operations. More particularly, first print head 550 performs printing operations on a side of label 500 indicated by an arrow 610 and second print head 560 performs printing operations a side of label 500 indicated by an arrow 620.

In an embodiment, when the applied adhesive is applied to the substrate it can be a pressure-sensitive adhesive. In such a case, pressure can be applied to the adhesive at a customer's location for the receipt to adhere to customer items, such as, but not limited to: paper/foil wraps, cardboard boxes, clam shells, fries sleeves, cups, etc.

Although the present invention has been described with particular reference to certain preferred embodiments thereof, variations and modifications of the present invention can be effected within the spirit and scope of the following claims.

The invention claimed is:

1. An adhesive label comprising:
   a first side of a substrate having a release coating; and
   a second side of the substrate having a mixture of approximately 74.7% of a first adhesive as a percentage of the mixture with approximately 25% of a second adhesive as a percentage of the mixture with approximately 0.3% of a thickener, wherein the mixture is applied to the second side as an adhesive patch, the first adhesive having a lower tack than the second adhesive and the mixture does not form a gel, and wherein a peel force of the adhesive patch is approximately 2.7 pound-force (lbf).

2. The adhesive label of claim 1, wherein the mixture has a greater viscosity than both the first adhesive and the second adhesive.

3. The adhesive label of claim 1, wherein the adhesive patch is applied to a selective portion of the second side of the substrate.

4. The adhesive label of claim 3, wherein the adhesive patch is applied as a geometric shape to the selective portion.

5. The adhesive label of claim 3, wherein the adhesive patch is applied as a logo or brand name to the selective portion.

6. The adhesive label of claim 5, wherein the mixture includes a colored dye.

7. The adhesive label of claim 1, wherein the first adhesive is a microsphere adhesive.

\* \* \* \* \*